Patented May 19, 1942

2,283,186

UNITED STATES PATENT OFFICE 2,283,186

THIAZANE-3,5-DICARBOXYLIC ACID DERIVATIVES

Robert D. Coghill, Peoria, Ill., assignor to Sharp & Dohme, Incorporated, Philadelphia, Pa., a corporation of Maryland No Drawing. Application February 26, 1940, Serial No. 320,898

4 Claims. (Cl. 260—243)

This invention is concerned with thiazane- and oxythiazane-3,5 derivatives and their $N^4$-substituted derivatives, and is a continuation-in-part of my copending application Serial No. 134,844 filed April 3, 1937, now Patent No. 2,191,452. The designation $N^4$ denotes the nitrogen atom in the 4-position in the thiazane ring.

The products of the invention correspond to the general formula

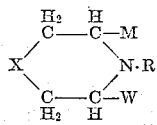

in which X is selected from the group of S, S=O, and S≡$O_2$, and R is a member of the group consisting of hydrogen and alkyl, aryl, aralkyl, acyl, aroyl, aralkoyl, carbalkoxy, carboaryloxy, and alicyclic radicals, and M is selected from the class of nitrile, carboxy, carbalkoxy, carboxamide carboxamidoalkyl, carbalkoxaminoalkyl radicals, and W is selected from the class of nitrile, carboxy, carbalkoxy, carboxamide, carboxamidoalkyl, carbalkoxaminoalkyl radicals, and also to mineral acid salts of any of said compounds having at least one nitrogen atom.

A wide variety of related types of derivatives are possible because the thiamorpholine nucleus with acid groups, such as the cyano or nitrilo (—CN), carboxamido or carboxylic acid amido (—$CONH_2$), and the carboxyl, in the 3,5-positions seems to be reasonably stable to ordinary reactions. The sulfur atom can be oxidized, for example, by a peroxide, such as hydrogen peroxide, to a sulfoxide, the nitrilo and carboxamido groups respond to hydrolysis and the carboxyl groups can be readily esterified.

Thus there are included in the invention compounds related in structure to thiazane 3,5-dicarboxylic acid and which include acid derivatives of this compound, such as the mono- and di- esters, the mono- and di- acid amides and halides, the mono- and di- nitriles, the nitriloamides or the nitrilocarboxamides, the salts with bases, in which one or both of the carboxylic hydrogens are replaced by metals or nitrogen bases, salts of the esters, etc., with acids (the carboxylic acids do not form crystallizable salts with acids, because of the influence of the carboxyl groups), closely related oxidized derivatives in which the sulfur atom is oxidized to form the coresponding sulfoxides or sulfones or sulfonium salts, and corresponding series of compounds in which the nitrogen-linked hydrogen is replaced by an alkyl, acyl, alkoxy, aralkyl, aryl, aryloxy, carbaryloxy, or other cyclohydrocarbon radical, which may be substituted or unsubstituted. Many of these new compounds are based upon thiazane 3,5-dicarboxylic acid; and a great number of compounds of the type indicated may be readily produced from this acid or its cogeners or homologues, particularly its acyl derivatives, such as the acid chlorides or amides, the production of which may or may not involve the intermediate production of the dicarboxylic acid.

In my Patent No. 2,191,452 there is described the preparation of thiazane-3-nitrilo-5-carboxamide and disclosed that it is readily hydrolyzed, for example, by concentrated acid to thiazane 3,5-di-carboxylic acid, both of which compounds are valuable as intermediates for the production of various thiazane derivatives, including mono- and di- esters such as may be produced by esterifying one or both of the carboxylic acid groups either with simple alkyl alcohols, such as ethanol, propanol, butanol and the like, or simple aryl alcohols, as, benzyl alcohol, or phenols, such as phenol, cresol, xylenol or other mono- or polyhydric phenol, or amino alcohols, such as dipropylaminoethanol, diethylaminopropanol, diethylaminoethanol, monoethanolamine, etc., to give esters of the types:

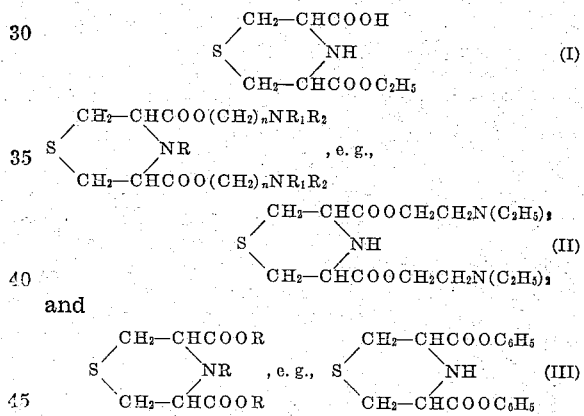

in which $n$ is an integer preferably equal to from 1 to 4, and in which R may be hydrogen or an alkyl, aryl, aralkyl, acyl, aroyl, aralkoyl, carbalkoxy, carboaryloxy, or alicyclic radical, and $R_1$ and $R_2$ may each be an alkyl, aryl, alkoxy or aryloxy group.

Such esters may be readily produced from the corresponding acid chlorides and the alcohols or phenols, or from the dicarboxylic acid and the alcohols in the presence of a suitable catalytic or esterifying agent, such as sodium or hydrogen chloride. The hydrochlorides of these esters are solid crystalline substances dissolving readily in water and giving an acid solution.

Products of the invention may be illustrated by but not restricted to certain of the esters and their hydrochlorides.

EXAMPLE 1.—*Dimethyl thiamorpholine-3,5-dicarboxylate hydrochloride.*—One gram of thoroughly dried and finely powdered thiamorpholine-3,5-dicarboxylic acid was suspended in 10 cc. freshly distilled acetyl chloride in a stoppered flask and the mixture chilled in an ice bath. 2.2 g. of coarsely powdered phosphorus pentachloride was added in three portions over a period of 15 minutes with cooling and shaking. To complete the reaction, the mixture was shaken by machine for one hour at room temperature and then chilled to 0° C. in an ice bath and filtered. The precipitate was washed once with acetyl chloride and then with several small portions of petroleum ether. 0.4 grm. of the washed product was added to 5 cc. anhydrous methanol; solution was immediate with evolution of heat. 6-8 volumes of dry ether were then added and the solution allowed to stand to obtain the dimethyl thiamorpholine-3,5-dicarboxylate hydrochloride, as clusters of colorless needles which melted with decomposition at 183–184° C.

EXAMPLE 2.—*Diethyl ester of thiamorpholine-3,5-dicarboxylic acid.*—A mixture of 10 g. of finely-powdered thiamorpholine - 3,5 - dicarboxylic acid, 200 cc. of absolute alcohol, and 5 cc. of concentrated sulfuric acid was refluxed for 24 hours in a 500 cc. 2 necked flask fitted with a dropping funnel and an efficient fractionating column equipped with a total-condensation, variable take-off stillhead. Ten cc. of dry benzene were added through the dropping funnel and distilled from the flask, first as the ternary mixture with alcohol and water boiling at 64°, and later as the binary mixture with alcohol boiling at 68° C., until the distillation temperature had risen to the boiling point of pure alcohol. This procedure was repeated after the eighth hour of refluxing. Little or none of the distillate came over below 68° C. After four hours of refluxing, the sulfuric acid was neutralized by the cautious addition of 10 g. of calcium carbonate, after which the mixture was filtered and the precipitate washed by trituration with a small amount of 95% alcohol. The alcohol was distilled from the combined filtrate and washings under reduced pressure and the residual syrup taken up in 25-30 cc. of water. The solution was made basic with sodium bicarbonate and extracted four times with 20 cc. portions of ether. After drying of the extract and removal of the ether the product was distilled in vacuo. A light yellow oil boiling at 154° C.–156° C. at 3 mm. was obtained. Yield: 8.3 g. (64%). The hydrochloride of this diethyl ester was obtained as white needles, from dry ether, and melted at 148° C.

EXAMPLE 3.—*β-Diethylaminoethyl ester of thiamorpholine-3,5-dicarboxylic acid (trihydrochloride).*—To 3.3 g. of the diethyl ester of thiamorpholine-3,5-dicarboxylic acid (such as obtained in Example 2) were added 50 cc. of freshly distilled β-diethylaminoethanol and 0.2 g. of sodium. The mixture was then refluxed for 1½ hours in a flask fitted with an efficient fractionating column equipped with a total-condensation, variable take-off stillhead. The ethyl alcohol formed in the alcoholysis was fractionated from the mixture at frequent intervals. About 1.5 cc. of material boiling below 150° C. was separated during the course of the reaction. The excess β-diethylaminoethanol was removed from the reaction mixture by distillation on the steam bath under reduced pressure, and the residue was dissolved in a small amount of ice-water. The solution was extracted three times with ether and the extracts washed three times with ice-water and dried. On passing hydrogen chloride into the ether solution the product separated as a dark tar, which was recrystallized from n-butyl alcohol. M. P. 208d. Yield: 1.3 g. (17%).

EXAMPLE 4.—*γ-Diethylaminopropyl ester of thiamorpholine-3,5-dicarboxylic acid (trihydrochloride).*—To γ-diethylaminopropanol hydrochloride, formed by saturating 10 cc. of γ-diethylaminopropanol with gaseous hydrogen chloride, 40 cc. of γ-diethylaminopropanol and 5 g. of diethyl thiamorpholine-3,5-dicarboxylate were added and the mixture refluxed for 3½ hours. The material boiling below 170° C. was withdrawn at the end of the first half hour and at hour intervals thereafter. After removal of the excess amino alcohol by distillation under reduced pressure, the residue was taken up in 30 cc. of ice cold 10 percent sodium hydroxide and extracted three times with ether. The ether extracts were washed three times with small portions of ice water, dried and the ether removed by distillation. The residue was heated to 170° C. at 10 mm. to remove the last traces of γ-diethylaminopropanol after which it was again dissolved in dry ether and the solution saturated with hydrogen chloride. The desired product which separated was recrystallized from n-butyl alcohol as a white micro-crystalline powder melting with decomposition at 214–215° C.

If instead of employing ammonia, for example, in the formation of the initial thiazane-3,5-nitriloamide, as by the method described in my Patent No. 2,191,452, primary amines be used, $N^4$-substituted thiazane 3,5-dicarboxylic acids are produced. Among the amines which may be used instead of ammonia, with the production of corresponding $N^4$-substituted compounds, are monomethylamine, monoethylamine, monopropylamine, monobutylamine, monoamylamine, and other primary alkyl amines, aniline, the toluidines, the xylidines, mesidine, benzylamine, cyclohexylamine, cyclopentylamine, etc. The reaction of one of these primary amines and hydrogen cyanide with thiodiacetaldehyde and 3,5-dihydroxythioxane results in the production of the $N^4$-substituted nitriloamides, which may be hydrolyzed to the corresponding $N^4$-substituted thiazane 3,5-dicarboxylic acids, represented by the structural formula:

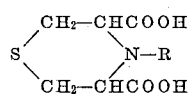

in which R may be an alkyl, acyl, aryl, aroyl, aralkyl, aralkoyl, carbalkoxy, carboaryloxy or alicyclic radical. These N-substituted derivatives may also be used as intermediates for the production of esters, such as the amino alcohol or substituted amino alcohol esters, etc., corresponding to the above types I, II, and III, but in which the hydrogen linked to the 4-nitrogen is replaced by a group indicated by R of the scope just above outlined.

If in a method substantially following that for the preparation of thiazane-3-nitrilo-5-carboxamide described in the example of my Patent No. 2,191,452, an amine, for example, an alkylamine such as methylamine, ethylamine, propylamine, butylamine, iso-amylamine, or heptylamine be employed instead of ammonia in the described use of ammonia after the hydrogen cyanide, there result the corresponding thiazane-3-nitrilo-5-carboxamides (or thiazane-3,5-cyanoamides) in which the hydrogen originally linked to the 4-position nitrogen is substituted by the alkyl group of the particular amine employed. The products obtained by this variation, in which the temperatures are kept below 10° C. during the addition of the amine, have the structural formula representing the nitriloamide in the two course reaction illustrated below. The preparation of this group of products of the invention may be illustrated by but not restricted to the following:

EXAMPLE 5.—*Amide of 4-methyl-3-nitrilothiazane-5-carboxylic acid.*—

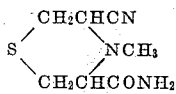

Thirteen grams of acetalyl sulfide were hydrolyzed by shaking with 75 cc. of warm 0.5% HCl, after which the solution was concentrated at 35° C. in vacuo to a volume of 25 cc. After chilling to 0° C., two drops of piperidine (as catalyst) and 4 cc. liquid hydrocyanic acid were added and the solution allowed to stand for ten minutes. Methylamine gas (prepared from 16 g. of the hydrochloride) was then led into the solution while maintaining the temperature between 10° and 20° C. White crystals separate as the reaction proceeds. After all the amine has been added, the mixture is stirred for 30 minutes and the crystals filtered off and washed with a little cold alcohol. The yield is 5.9 g. (65%). After recrystallization from 95% alcohol it melts at 208° C. with decomposition.

By the corresponding procedure, but during which liquid amines were added slowly from a dropping funnel, other similar $N^4$-alkyl nitriloamides were obtained, such as those listed below with the respective melting points shown.

| $N^4$-alkyl-3-nitrilothiazane-5-carboxamide | Melting point |
|---|---|
| | °C. |
| N-ethyl-3-nitrilothiamorpholine-5-carboxamide | 177 dec. |
| N-n-butyl-3-nitrilothiamorpholine-5-carboxamide | 192 dec. |
| N-n-amyl-3-nitrilothiamorpholine-5-carboxamide | 174 dec. |
| N-iso-amyl-3-nitrilothiamorpholine-5-carboxamide | 191 dec. |
| N-n-heptyl-3-nitrilothiamorpholine-5-carboxamide | 181 dec. |

Furthermore, if in the treatment including the hydrogen cyanide and ammonia, the reaction is permitted to proceed at higher temperatures, such as 65–70° C., the corresponding thiazane-3,5-dinitrile results rather than the nitriloamide. The same modification occurs when an amine such as an alkylamine as methyl-, ethyl-, propyl-, n-butyl-, n-amyl-, iso-amyl-, and n-heptylamine, or an arylamine as benzylamine, is substituted for the ammonia, the dinitriles being formed at the elevated temperatures. These reactions can be expressed by the following equations:

In both of these types of products, R may be the same as in the $N^4$-substituted thiazane-3,5-dicarboxylic acid derivatives.

The preparation of the dinitriles (or dicyanides) is illustrated by but not restricted to the following:

EXAMPLE 6.—*3,5 - dinitrilothiamorpholine.*— Fifty-three grams of acetalyl sulfide was hydrolyzed and the resulting solution of thiodiacetaldehyde concentrated to 100 cc. (as previously described in J. A. C. S. vol. 59, p. 801 (1937)). To this solution, held at a temperature of 0°, were added 4 drops of piperidine and 16 cc. of liquid HCN. After ten minutes standing seven grams of ammonia gas were led in without cooling. The temperature rapidly rose to 70° and a crystalline material separated. This was filtered off, washed with ice-water and dried. Yield, 13.9 g. or 43%. After recrystallization from 95% alcohol the product was obtained as four-sided plates which melted with decomposition at 214°.

EXAMPLE 7.—*4-methyl-3,5-dinitrilothiazane.*—

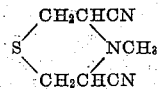

This substance is prepared in the same manner as the nitriloamide described in Example 5, except that the methylamine gas is added as quickly as possible, allowing the temperature to rise to 65° C. The product is isolated in the same manner. The yield is 3.9 g. (38%). After recrystallization from 95% alcohol it appears as four-sided plates melting at 178° C.

If the methylamine is not added fast enough, a mixture of the dinitrile with the nitriloamide is obtained. The latter is less soluble in 95% ethyl alcohol.

Following the method of Example 6 or of Example 7, other $N^4$-derivatives of thiazane-3,5-dinitriles can be obtained, such as the hydrocarbon substituents as the alkyl or aryl by replacing the ammonia or methylamine in the respective procedure by, for example, ethylamine or benzylamine. Thus N-ethyl-3,5-dinitrilothiamorpholine with melting point 137° C. and N-benzyl-3,5-dinitrilothiamorpholine melting at 170° C. were obtained.

Also typical of the invention are thiazane-3-nitrilo-5-carboxylic acid and its $N^4$-derivatives, in which there is linked to the 4-nitrogen a hydrogen atom or any other radical in the definition for R as used in the same position in the derivatives hereinabove described, for example, by using cold fuming hydrochloric acid, the carboxamide group of 4-methyl 3-nitrilo-thiazane-5-carboxamide was hydrolyzed to a carboxyl group yielding the corresponding nitriloacid

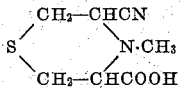

as illustrated by, but not restricted to:

EXAMPLE 8.—*N-methyl-3-nitrilothiamorpholine-5-carboxylic acid.*—Five grams of N-methyl-

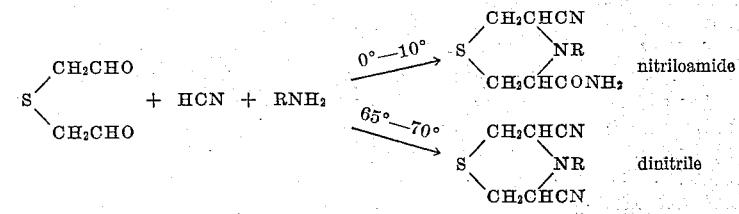

3-nitrilothiamorpholine carboxamide was dissolved in 50 cc. of cold fuming HCl and allowed to stand for five days at 10° and an additional five days at room temperature. After removal of the HCl in vacuo at low temperature the residue was taken up in 50 cc. of cold water, which dissolved the tarry material and leaving some crystals in suspension. These were filtered off, washed, and recrystallized from boiling water. They melted at 184–185° and decomposed aqueous NaHCO₃. Yield, 0.6 g. (12%).

In addition to the monocarboxamides hereinabove referred to, the invention also embraces the dicarboxamides which not only include the form of the primary amine but also that of the secondary amine, which latter amides of thiamorpholine-3,5-dicarboxylic acid have the general formula:

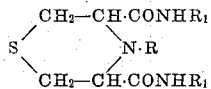

in which R may be hydrogen or any other radical in the hereinabove corresponding definitions of the element R, and in which R₁ may be an alkyl group such as methyl, ethyl, propyl, butyl and the like, or an aryl group such as phenyl, benzyl and the like, or a monoalkylaminoalkyl group as ethylaminoethyl, etc., or a di-alkylaminoalkyl group as diethylaminoethyl, diethylaminopropyl, and the like, as typified by but not restricted to:

EXAMPLE 9.—*Thiamorpholine - 3,5 - di - β - diethylaminoethyl) -carboxamide.*—A mixture of 1 gram of the diethyl ester of thiamorpholine-3,5-dicarboxylic acid and 1.5 grams of β-diethylaminoethylamine was heated to 160°–170° C. for twelve hours in an open test tube supported in a Wood's metal bath. Excess amine was removed from the reaction mixture by distillation on the steam bath under reduced pressure. The residue was dissolved in 50 cc. of dry ether and the product precipitated as the hydrochloride by adding an ethereal solution of HCl. The material so obtained was a tan-colored, very hygroscopic crystalline solid. It was purified by dissolving in hot absolute alcohol, adding ether to the point of turbidity, and allowing to cool. After four such recrystallizations a pure white, practically non-hygroscopic product was obtained which decomposed in the neighborhood of 245° C., depending on the rate of heating. Yield: 1.1 g. (55%).

The thiazane 3,5-dicarboxylic acids also embrace $N^4$-acyl as acetyl and the like, -alkoxy, as ethoxy, etc., -carbalkoxy as carbethoxy (a urethane derivative), etc., and the -carboalkoxy groups, exemplified by but not restricted to:

EXAMPLE 10. — *4 - carbethoxythiazane - 3,5-dicarboxylic acid.*—

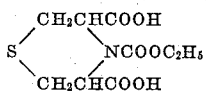

Four grams of thiazane-3,5-dicarboxylic acid, 5 g. of magnesium oxide, 50 cc. of water, and 20 cc. of ether were placed in a small flask equipped with a mechanical stirrer. The flask was then placed in an ice bath and 16 cc. of ethyl chlorocarbonate added gradually over a period of 12 hours, vigorous stirring being maintained over this time. The flask was then stirred for a further 12 hours at room temperature, by which time most of the suspended material had dissolved. The mixture was then acidified with HCl and the product extracted with ethyl acetate. The ethyl acetate was removed in vacuo and the gummy residue washed twice with warm benzene. The white powder remaining weighed 3.7 g. (67% yield) and was recrystallized from water to give white plates containing one mole of water of crystallization. Upon heating it gave off a gas at 107° C. and melted with decomposition at 145°–155°.

EXAMPLE 11.—*N - carbobenzoxythiamorpholine-3,5-dicarboxylic acid.*—A mixture of 2 g. of thiamorpholine-3,5-dicarboxylic acid and 5 g. of sodium bicarbonate was dissolved in about 20 cc. of water. The solution was treated with 6 cc. of carbobenzoxy chloride, added in four portions over a period of two hours. Between additions the mixture was shaken in the shaking machine. Shaking was continued overnight (15 hours) to complete the reaction. The solution was then extracted three times with ether to remove benzyl alcohol and any unchanged carbobenzoxy chloride, treated with "Norite" for an hour at room temperature, and filtered. Upon acidification of the filtrate with hydrochloric acid, the product separated as an oil, which after standing overnight in an oven at about 40° became crystalline. Yield: 2 g. (59%).

Upon slow evaporation of a water solution of this material, colorless rectangular prisms were obtained which melted at 149.5°–150° C.

EXAMPLE 12.—*N-acetyl thiamorpholine-3,5-dicarboxylic acid anhydride.*—This compound was obtained by adding thiamorpholine-3,5-dicarboxylic acid to boiling acetic anhydride. M. P. 143d. The dicarboxylic acid derivatives thus also include the anhydrides.

In the compounds of the character described the sulfur atom has a valence of but 2, so that it may readily be oxidized by suitable agents such as hydrogen peroxide, the halogens, nitric acid, potassium permanganate, etc., with the production of the corresponding sulfoxides and sulfones.

The sulfoxide derivatives are obtained when the oxidation is carried out with relatively mild oxidizing agents, such as hydrogen peroxide or dilute nitric acid, the sulfur being oxidized to a valence of 4. The sulfoxide of thiazane 3,5-dicarboxylic acid may be represented by the formula:

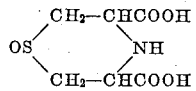

Its preparation which follows is typical of but not preclusive of the oxythiazane derivatives:

EXAMPLE 13. — *1 - oxothiamorpholine - 3,5 - dicarboxylic acid.*—One gram of thiamorpholine-3,5-dicarboxylic acid, 20 cc. of acetic acid and 5 cc. of acetic anhydride were mixed in a round-bottomed flask equipped with a stirrer and cooled in an ice-salt bath. One gram of 30% hydrogen peroxide was then added slowly during vigorous stirring. The reaction was then allowed to stand at room temperature for five days. During that time crystals separated. These were filtered off, washed with water and recrystallized from water. M. P. 242d. The yield was .69 g. (64%).

When more vigorous oxidizing agents, such as concentrated nitric acid, are used, the sulfur is oxidized to a valence of 6, giving the sulfones. The sulfone of thiazane 3,5-dicarboxylic acid may be represented by the formula:

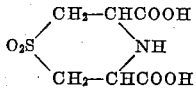

These sulfoxides and sulfones form series of compounds related to those described above, but having the sulfoxide or sulfone structure rather than the simple thiazane structure.

In some cases, the sulfoxide and sulfone derivatives may also be prepared by oxidizing the acetalyl sulfide prior to the ring closure, so that the new sulfone or sulfoxide derivatives are produced directly when the ring closure is effected, rather than by the oxidation of the corresponding thiazane derivatives.

The acidic hydrogens of the dicarboxylic acids may be replaced by a monovalent metal, such as sodium or potassium, or an equivalent of a polyvalent metal, such as calcium or magnesium, or a nitrogen base, such as ammonia, alkylamines or dialkylamines, such as ethylamine or diethylamine, alkylol amines, such as diethanolamine, phenylpropanolamine, or the like, to form salts, advantageously by simple neutralization. The dicarboxylic acids do not form crystallizable salts with acids, although they do dissolve in mineral acids, but their esterified derivatives, with the carboxyl groups blocked, form such salts, as with the hydrohalogen acids, etc.; such salts being formed because of the basic nature of the trivalent nitrogen.

The term ester-compounds is used in the specification and claims to designate generically both the esters and the mineral acid salts of the esters, for example, esters of thiazane-3,5 dicarboxylic acid derivatives and mineral acid salts of the esters of thiazane-3,5 dicarboxylic acid derivatives.

The dicarboxylic acids are readily converted into the corresponding acid chlorides, as by treatment with sulfonyl chloride. These chlorides then may be advantageously used as intermediates for the production of esters, for example, the di- acid chlorides giving the corresponding di- esters with alcohols or phenols. Treatment of the acid chlorides with ammonia produces the corresponding acid amides, which are also useful as intermediates, and which may be dehydrated to yield the corresponding nitriles. These compounds, the acid halides, the acid amides, and the nitriles are included in the group designated as the acid derivatives of the dicarboxylic acids.

The products of the invention are useful as intermediates for the preparation of other substances applicable in the industrial arts for example for the production of chemotherapeutical agents, some of them per se being useful as such agents, indicating anesthetic and hypnotic properties, and show low toxicity. N-carbethoxy thiazane-3,5-dicarboxylic acid showed no toxicity in white mice when administered to the extent of 5000 mg. per kilogram body weight.

I claim:

1. Compounds of the group consisting of thiazane- and oxythiazane-3,5 derivatives having the formula

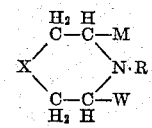

in which X is selected from the group of S, S=O, and S≡O$_2$, and R is a member of the group consisting of hydrogen and alkyl, aryl, aralkyl, acyl, aroyl, aralkoyl, carbalkoxy, carboaryloxy, and alicyclic radicals, and M is selected from the class of nitrile, carboxy, carbalkoxy, carboxamide, carboxamidoalkyl, carbalkoxaminoalkyl radicals, and W is selected from the class of nitrile, carboxy, carbalkoxy, carboxamide, carboxamidoalkyl, carbalkoxaminoalkyl radicals, and also consisting of mineral acid salts of any of said compounds having at least one nitrogen atom.

2. Ester-compounds of the thiazane-3,5 dicarboxylic acid derivatives of claim 1.

3. Ester-compounds of the oxythiazane-3,5 dicarboxylic acid derivatives of claim 1.

4. Mineral acid salts of esters of the thiazane-3,5 dicarboxylic acid derivatives of claim 1.

ROBERT D. COGHILL.